(12) United States Patent
Owens

(10) Patent No.: US 7,840,982 B1
(45) Date of Patent: Nov. 23, 2010

(54) VIDEO-ALL CALL SYSTEM AND METHOD FOR A FACILITY

(75) Inventor: Steve B. Owens, Kansas City, MO (US)

(73) Assignee: Embarq Holding Company, LLC, Overland Park, KS (US)

(*) Notice: Subject to any disclaimer, the term of this patent is extended or adjusted under 35 U.S.C. 154(b) by 1271 days.

(21) Appl. No.: 10/951,740

(22) Filed: Sep. 28, 2004

(51) Int. Cl.
*H04N 7/18* (2006.01)
(52) U.S. Cl. .......................................... 725/78; 725/82
(58) Field of Classification Search ............. 725/74–85, 725/109
See application file for complete search history.

(56) References Cited

U.S. PATENT DOCUMENTS

| | | | |
|---|---|---|---|
| 3,703,714 A | 11/1972 | Andrews | |
| 3,997,718 A | 12/1976 | Ricketts et al. | |
| 4,303,937 A * | 12/1981 | Cook | 725/78 |
| 4,375,637 A | 3/1983 | Desjardins | |
| 4,656,656 A | 4/1987 | Mundy et al. | |
| 4,866,515 A * | 9/1989 | Tagawa et al. | 725/77 |
| 4,872,195 A | 10/1989 | Leonard | |
| 4,959,713 A | 9/1990 | Morotomi et al. | |
| 4,992,866 A | 2/1991 | Morgan | |
| 5,027,211 A | 6/1991 | Robertson | |
| 5,061,916 A | 10/1991 | French et al. | |
| 5,086,385 A | 2/1992 | Launey | |
| 5,109,222 A | 4/1992 | Welty | |
| 5,172,413 A | 12/1992 | Bradley et al. | |
| 5,187,735 A | 2/1993 | Garcia et al. | |
| 5,310,349 A | 5/1994 | Daniels et al. | |
| 5,479,267 A | 12/1995 | Hashimoto | |
| 5,550,863 A | 8/1996 | Yurt et al. | |
| 5,565,908 A | 10/1996 | Ahmad | |
| 5,585,838 A | 12/1996 | Lawler et al. | |
| 5,594,786 A | 1/1997 | Chaco et al. | |
| 5,601,432 A | 2/1997 | Bergman | |
| 5,621,456 A | 4/1997 | Florin et al. | |
| 5,684,952 A | 11/1997 | Stein | |
| 5,689,242 A | 11/1997 | Sims et al. | |
| 5,790,176 A | 8/1998 | Craig | |
| 5,790,935 A | 8/1998 | Payton | |
| 5,940,594 A | 8/1999 | Ali et al. | |
| 6,020,881 A | 2/2000 | Naughton et al. | |
| 6,038,425 A | 3/2000 | Jeffrey | |
| 6,049,823 A | 4/2000 | Hwang | |
| 6,060,994 A | 5/2000 | Chen | |

(Continued)

OTHER PUBLICATIONS

TrueCom Building Communications Systems Communications Controllers 5120 Series, May 1998, Publication S5120-0012-7, pp. 1-6.

(Continued)

*Primary Examiner*—Christopher Kelley
*Assistant Examiner*—Charles N Hicks
(74) *Attorney, Agent, or Firm*—Sonnenschein Nath Rosenthal LLP

(57) ABSTRACT

A system and method using digital technologies to deliver a live-video-all-call bulletin over a local area network (LAN) in a facility, e.g., a school. The live video overrides all the facility's video-player devices by pausing them. Once the live-feed-video presentation is over, the system returns all of the facilities video players to the same state of operation each was in before the all-call presentation began.

26 Claims, 3 Drawing Sheets

U.S. PATENT DOCUMENTS

| | | | |
|---|---|---|---|
| 6,072,395 | A | 6/2000 | Vega |
| 6,149,441 | A | 11/2000 | Pellegrino et al. |
| 6,182,128 | B1 | 1/2001 | Kelkar et al. |
| 6,185,773 | B1 | 2/2001 | Goedde |
| 6,192,282 | B1 | 2/2001 | Smith et al. |
| 6,233,428 | B1 | 5/2001 | Fryer |
| 6,240,410 | B1 | 5/2001 | Wical |
| 6,370,323 | B1 | 4/2002 | Adolph et al. |
| 6,374,079 | B1 | 4/2002 | Hsu |
| 6,438,596 | B1 | 8/2002 | Ueno et al. |
| 6,501,502 | B1 | 12/2002 | Chen |
| 6,507,726 | B1 | 1/2003 | Atkinson et al. |
| 6,561,812 | B1 | 5/2003 | Burmester et al. |
| 6,603,847 | B1 | 8/2003 | Griffith |
| 6,661,340 | B1 | 12/2003 | Saylor et al. |
| 6,748,597 | B1 | 6/2004 | Frisco et al. |
| 6,769,127 | B1 | 7/2004 | Bonomi et al. |
| 6,775,518 | B2 | 8/2004 | Norcott et al. |
| 6,813,777 | B1 * | 11/2004 | Weinberger et al. .......... 725/76 |
| 6,844,807 | B2 | 1/2005 | Inoue et al. |
| 6,879,243 | B1 | 4/2005 | Booth et al. |
| 6,925,499 | B1 | 8/2005 | Chen et al. |
| 6,970,183 | B1 | 11/2005 | Monroe |
| 6,975,346 | B2 | 12/2005 | Kumhyr |
| 7,028,096 | B1 | 4/2006 | Lee |
| 7,046,689 | B2 | 5/2006 | Burnes et al. |
| 7,123,142 | B2 | 10/2006 | Bohbot et al. |
| 7,159,233 | B2 | 1/2007 | Son et al. |
| 7,185,282 | B1 | 2/2007 | Naidoo et al. |
| 7,246,369 | B1 | 7/2007 | Duan et al. |
| 7,697,927 | B1 | 4/2010 | Owens |
| 7,714,728 | B2 | 5/2010 | Koblaz |
| 7,765,573 | B1 | 7/2010 | Owens |
| 7,786,891 | B2 | 8/2010 | Owens |
| 2002/0033760 | A1 | 3/2002 | Kobayashi |
| 2002/0038461 | A1 | 3/2002 | White et al. |
| 2002/0048224 | A1 | 4/2002 | Dygert et al. |
| 2002/0049977 | A1 | 4/2002 | Miller et al. |
| 2002/0112121 | A1 | 8/2002 | Gerszberg et al. |
| 2002/0124258 | A1 | 9/2002 | Fritsch |
| 2002/0138842 | A1 | 9/2002 | Chong et al. |
| 2002/0164155 | A1 | 11/2002 | Mate |
| 2002/0166123 | A1 * | 11/2002 | Schrader et al. ............... 725/58 |
| 2002/0180579 | A1 | 12/2002 | Nagaoka et al. |
| 2003/0009668 | A1 | 1/2003 | Chan et al. |
| 2003/0046369 | A1 | 3/2003 | Sim et al. |
| 2003/0050935 | A1 | 3/2003 | Spetsmann |
| 2003/0051239 | A1 | 3/2003 | Hudspeth |
| 2003/0105854 | A1 | 6/2003 | Thorsteinsson et al. |
| 2003/0121050 | A1 | 6/2003 | Kalva et al. |
| 2003/0123450 | A1 | 7/2003 | Wright et al. |
| 2003/0182420 | A1 | 9/2003 | Jones et al. |
| 2003/0191802 | A1 | 10/2003 | Zhao et al. |
| 2003/0200009 | A1 | 10/2003 | Von Kannewurff et al. |
| 2003/0204856 | A1 | 10/2003 | Buxton |
| 2003/0208762 | A1 | 11/2003 | Hanai et al. |
| 2004/0003051 | A1 | 1/2004 | Krzyzanowski et al. |
| 2004/0015993 | A1 | 1/2004 | Yacenda et al. |
| 2004/9993051 | | 1/2004 | Krzyzanowski et al. |
| 2004/0039757 | A1 | 2/2004 | McClure |
| 2004/0049789 | A1 | 3/2004 | Bower et al. |
| 2004/0117638 | A1 | 6/2004 | Monroe |
| 2004/0117647 | A1 | 6/2004 | Ballard |
| 2004/0148632 | A1 | 7/2004 | Park et al. |
| 2004/0172658 | A1 | 9/2004 | Rakib et al. |
| 2004/0194148 | A1 | 9/2004 | Schultz et al. |
| 2004/0210944 | A1 * | 10/2004 | Brassil et al. ............... 725/135 |
| 2004/0253945 | A1 | 12/2004 | Janik |
| 2004/0268410 | A1 | 12/2004 | Barton et al. |
| 2005/0003338 | A1 | 1/2005 | Norcott |
| 2005/0028208 | A1 | 2/2005 | Ellis et al. |
| 2005/0044166 | A1 | 2/2005 | Colville et al. |
| 2005/0078934 | A1 | 4/2005 | Fish et al. |
| 2005/0080818 | A1 | 4/2005 | Kindberg et al. |
| 2005/0131957 | A1 | 6/2005 | Watkinson |
| 2005/0177853 | A1 | 8/2005 | Williams et al. |
| 2005/0254440 | A1 | 11/2005 | Sorrell |
| 2005/0278773 | A1 | 12/2005 | DeCinque et al. |
| 2006/0004606 | A1 | 1/2006 | Wendl et al. |
| 2006/0005224 | A1 | 1/2006 | Dunning et al. |
| 2006/0020993 | A1 * | 1/2006 | Hannum et al. ............. 725/111 |
| 2006/0069736 | A1 | 3/2006 | Czeisler et al. |
| 2006/0085824 | A1 | 4/2006 | Bruck et al. |
| 2006/0088806 | A1 | 4/2006 | Quinn |
| 2006/0220798 | A1 | 10/2006 | Willis |
| 2007/0006276 | A1 | 1/2007 | Ashley et al. |
| 2007/0050828 | A1 | 3/2007 | Renzi et al. |
| 2007/0130590 | A1 | 6/2007 | Nash-Putnam |
| 2008/0016545 | A1 | 1/2008 | DeCinque et al. |
| 2008/0092168 | A1 * | 4/2008 | Logan et al. .................. 725/44 |

OTHER PUBLICATIONS

Advancements Bring Windows-based Software, Ethernet Network Compatibility to 5120 Intercom Systems, Feb. 2001, pp. 1-2.
Sprint TekNet IP for Higher Education press release.
Sprint TekNet IP Overview press release.
System Integrates All School Tech Functions press release.
Sprint TekNet IP Integrated Communications System, Installation Overview.
Sprint TekNet IP Installation Manual.
IC-Net Systems—FF Coax Network, ICC-Smart TV Controllers.
The submission of the above documents is not an admission of any kind. E.G., it is not admitted that any of these documents are printed publications, available as prior art, *inter alia*.
Non-Final Office Action date mailed Jan. 21, 2009 for U.S. Appl. No. 10/694,337.
Non-Final Office Action date mailed Dec. 11, 2008 for U.S. Appl. No. 10/803,046.
Advisory Action date mailed Jul. 28, 2008 for U.S. Appl. No. 10/928,568.
RCE/Response filed Oct. 28, 2008 to Final Office Action date mailed Apr. 28, 2008 for U.S. Appl. No. 10/928,568.
Non-Final Office Action date mailed Jan. 9, 2009 for U.S. Appl. No. 10/928,568.
Final Office Action date mailed Jan. 7, 2009 for U.S. Appl. No. 11/074,861.
Response filed Mar. 18, 2009 to Non-Final Action dated Jan. 21, 2009 in U.S. Appl. No. 10/694,337.
Final Rejection date mailed Jun. 18, 2009 in U.S. Appl. No. 10/694,337.
Response filed Aug. 13, 2009 to Final Rejection dated Jun. 18, 2009 in U.S. Appl. No. 10/694,337.
Advisory Action date mailed Aug. 31, 2009 in U.S. Appl. No. 10/694,337.
Pre-Appeal Brief Reqeust For Review and Remarks to same; Notice of Appeal all filed on Sep. 18, 2009 in U.S. Appl. No. 10/694,337.
Pre-Appeal Conference Decision date mailed Nov. 18, 2009 in U.S. Appl. No. 10/694,337.
RCE/Amendment filed Dec. 16, 2009 in U.S. Appl. No. 10/694,337.
Non-Final Rejection date mailed Jan. 20, 2010 in U.S. Appl. No. 10/694,337.
Non-Final Office Action dated Dec. 11, 2008 in U.S. Appl. No. 10/803,046.
Response filed Mar. 11, 2009 to Non-Final Action dated Dec. 11, 2008 in U.S. Appl. No. 10/803,046.
Final Rejection date mailed Jul. 14, 2009 in U.S. Appl. No. 10/803,046.
Response filed Sep. 14, 2009 to Final Action dated Jul. 14, 2009 in U.S. Appl. No. 10/803,046.
Advisory Action date mailed Oct. 1, 2009 in U.S. Appl. No. 10/803,046.
RCE/Amendment filed Dec. 14, 2009 in U.S. Appl. No. 10/803,046.

Response filed Apr. 9, 2009 to Non-Final Action date mailed Jan. 29, 2009 in U.S. Appl. No. 10/928,568.
Final Rejection date mailed Jul. 30, 2009 in U.S. Appl. No. 10/928,568.
Non-Final Rejection date mailed Apr. 2, 2009 in U.S. Appl. No. 11/897,439.
Response filed Apr. 16, 2009 to Non-Final Action date mailed Apr. 2, 2009 in U.S. Appl. No. 11/897,439.
Final Rejection date mailed Jul. 14, 2009 in U.S. Appl. No. 11/897,439.
Response filed Aug. 4, 2009 to Final Rejection dated Jul. 14, 2009 in U.S. Appl. No. 11/897,439.
Advisory Action date mailed Sep. 18, 2009 in U.S. Appl. No. 11/897,439.
RCE/Amendment filed Oct. 5, 2009 in U.S. Appl. No. 11/897,439.
Non-Final Rejection date mailed Dec. 16, 2009 in U.S. Appl. No. 11/897,439.
Final Rejection date mailed Mar. 4, 2009 in U.S. Appl. No. 11/042,263.
Pre-Appeal Request for Review and Remarks to same; Notice of Appeal all filed on Apr. 10, 2009 in U.S. Appl. No. 11/042,263.
Pre-Brief Appeal Conference Decision date mailed Sep. 8, 2009 in U.S. Appl. No. 11/042,263.
Notice of Allowance and Fees Due date mailed Dec. 7, 2009 in U.S. Appl. No. 11/042,263.
RCE/Amendment filed Feb. 27, 2009 to Final Action dated Jan. 7, 2009 in U.S. Appl. No. 11/074,861.
Non-Final Rejection date mailed Mar. 23, 2009 in U.S. Appl. No. 11/074,861.
Response filed Apr. 16, 2009 to Non-Final Rejection date mailed Mar. 23, 2009 in U.S. Appl. No. 11/074,861.
Final Rejection date mailed Jun. 10, 2009 in U.S. Appl. No. 11/074,861.
Response filed Aug. 10, 2009 to Final Action dated Jun. 10, 2009 in U.S. Appl. No. 11/074,861.
Advisory Action date mailed Aug. 26, 2009 in U.S. Appl. No. 11/074,861.
RCE/Amendment filed Sep. 8, 2009 in U.S. Appl. No. 11/074,861.
Non-Final Rejection date mailed Oct. 14, 2009 in U.S. Appl. No. 11/074,861.
Amendment filed Jan. 13, 2010 to Non-Final Rejection dated Oct. 14, 2009 in U.S. Appl. No. 11/074,861.
Examiner Interview Summary date mailed Jan. 13, 2010 in U.S. Appl. No. 11/074,861.
Response filed Feb. 26, 2010 to Non-Final Rejection date mailed Jan. 20, 2010 in U.S. Appl. No. 10/694,337.
Examiner Interview Summary date mailed Mar. 5, 2010 in U.S. Appl. No. 10/694,337.
Non-Final Rejection date mailed Feb. 22, 2010 in U.S. Appl. No. 10/803,046.
Reply filed Mar. 3, 2010 to Non-Final Rejection dated Dec. 16, 2010 U.S. Appl. No. 11/897,439.
Final Rejection date mailed May 11, 2010 in U.S. Appl. No. 10/694,337.
Notice of Abandonment date mailed Mar. 3, 2010 in U.S. Appl. No. 10/928,568.
Notice of Allowance date mailed Apr. 14, 2010 in U.S. Appl. No. 11/074,861.
Non-Final Action date mailed Jun. 1, 2010 in U.S. Appl. No. 12/112,738.
Notice of Allowance date mailed Jun. 15, 2010 in U.S. Appl. No. 11/897,439.
Response filed Jun. 17, 2010 to Non-Final Rejection dated Feb. 22, 2010 in U.S. Appl. No. 10/803,046.
Non-Final Office Action dated Mar. 23, 2007 for U.S. Appl. No. 10/236,286.
Response filed Jul. 23, 2007 to Non-Final Office Action dated Mar. 23, 2007 for U.S. Appl. No. 10/236,286.
Final Office Action dated Oct. 16, 2007 for U.S. Appl. No. 10/236,286.
Response filed Oct. 26, 2007 to Final Office Action dated Oct. 16, 2007 for U.S. Appl. No. 10/236,286.
Advisory Action dated Nov. 19, 2007 for U.S. Appl. No. 10/236,286.
Non-Final Office Action dated Feb. 13, 2008 for U.S. Appl. No. 10/236,286.
Response filed May 13, 2008 to Non-Final Office Action dated Feb. 13, 2008 for U.S. Appl. No. 10/236,286.
Final Office Action dated Sep. 10, 2008 for U.S. Appl. No. 10/236,286.
Non-Final Office Action dated Dec. 11, 2007 for U.S. Appl. No. 10/803,046.
Response filed Mar. 11, 2008 to Non-Final Office Action dated Dec. 11, 2007 for U.S. Appl. No. 10/803,046.
Final Office Action dated Jun. 3, 2008 for U.S. Appl. No. 10/803,046.
Response filed Sep. 3, 2008 to Final Office Action dated Jun. 3, 2008 for U.S. Appl. No. 10/803,046.
Non-Final Office Action dated Nov. 16, 2006 for U.S. Appl. No. 10/928,568.
Response filed Feb. 16, 2007 to Non-Final Office Action dated Nov. 16, 2006 for U.S. Appl. No. 10/928,568.
Final Office Action dated May 21, 2007 for U.S. Appl. No. 10/928,568.
Response filed Jul. 20, 2007 to Final Office Action dated May 21, 2007 for U.S. Appl. No. 10/928,568.
Non-Final Office Action dated Oct. 10, 2007 for U.S. Appl. No. 10/928,568.
Response filed Jan. 8, 2007 to Non-Final Office Action dated Oct. 10, 2007 for U.S. Appl. No. 10/928,568.
Final Office Action dated Apr. 28, 2008 for U.S. Appl. No. 10/928,568.
RCE and Response filed Jun. 30, 2008 to Final Office Action dated Apr. 28, 2008 for U.S. Appl. No. 10/928,568.
Non-Final Office Action dated Aug. 1, 2008 for U.S. Appl. No. 11/074,861.
Response filed Nov. 3, 2008 to Non-Final Office Action dated Aug. 1, 2008 for U.S. Appl. No. 11/074,861.
Supplemental Notice of Allowability date mailed Jul. 22, 2010 in U.S. Appl. No. 11/897,439.

* cited by examiner

VIDEO-ALL CALL SYSTEM AND METHOD FOR A FACILITY

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

This invention relates to the field of media and communication control devices in facilities. More specifically, this invention relates to using digital technologies to deliver a live video feed over a local area network (LAN) in a facility while retrievably overriding the currently displayed content on a plurality of video display devices included in the facility's video network.

2. Description of the Related Art

Schools have traditionally used intercoms, paging systems, and public address systems. Over the years, technologies developed enabling the use of more advanced audio-visual equipment. For example, it's not unusual for the rooms in a school, or other facility, interconnected by an existing cable network. On each cable network, numerous media players, for example televisions, are all shared. Each of these media players are capable of receiving analog signals. The signals are combined. Different signals may be accessed by changing the channel. The source for these signals could come from outside the facility in some sort of broadcast or cable transmittal. The signal might have also come from a media device, such as a VCR or DVD within the facility.

Eventually, schools developed systems capable of providing video announcements. These audio/video systems have replaced the traditional audio-only equipment in many schools. The addition of video has enabled these schools to display live video content to, e.g., the classrooms, and other locations in the school which included televisions tapped into the facilities cable network.

These prior-art-video-announcement systems, however, have their disadvantages.

First, these systems usually require the announcement consistently be made from the same classroom. The camera used is typically of the analog-signal-producing ilk. In order to use the camera to play live video using the school's existing systems, an additional coax line must be run from the camera's location to what is typically an audio visual/computer equipment room in the school. This room is where the audio visual players, e.g., VCR's, and computing equipment, servers, etc. exist. It also may include a switching device capable of switching video content playing on a particular analog device, e.g., a VCR to play on a particular television in a classroom, or a plurality of televisions in a plurality of classrooms.

To set up for live video, the school will typically install an additional coax outlet in the room in which a broadcast is to be made. From the installed outlet, a coax line serving this outlet runs back to the switching device in the equipment room and serves as a video in line from the camera to the facility's AV system. From the switch, there will already be output coax lines which transmit video to the televisions in the classrooms.

Before starting the live video feed, a user must plug the camera into the input coax outlet. Then someone in the equipment room must manually stop or pause all the media playing devices, e.g., VCR's, DVD's. Once these devices have been stopped or paused, the switching device in the equipment room must be manipulated so that the input feed from the camera is broadcast on the desired televisions in the particular classrooms for which the announcement needs to be heard. This will enable the live feed to the classrooms, and the presentation is made.

Once the broadcast is finished, the feed is terminated by manipulating the switching device to again accept video content from the other media playing devices. The user is then required to manually un-pause and/or play these media devices to resume playing. The task of returning all of the player devices to the exact states existent before the live video feed is very cumbersome, time consuming, and prone to error.

Some schools have utilized a system wherein a live video announcement may be made from a plurality of classrooms or other rooms. This is accomplished by installing an extra coax outlet in each room in which live broadcasts are to be made from, and then running coax video input lines all the way back from each outlet to the AV room in the school.

An example of this type of system is shown in prior-art FIG. 1. Referring to the figure, we see that a school has a plurality of classrooms 110, 112, 114, and 116. Each classroom has a television included therein for playing video content. Room 110 includes a television 140. Room 112 includes a television 142. Room 114 includes a television 144. Room 116 includes a television 146. Each of these televisions are connected through coax lines 154, 156, 158, and 160. These are normally a part of the school's conventional cable television network.

Through these lines, the televisions are able to receive and demodulate modulated/combined analog signals emitted from a plurality of outputs 138. These outputs may represent the outputs from VCR's, DVD's or other known video playing devices. They may also be a part of a more complicated system which is included in a central control room 118.

Control room 118 includes an output device 136. Output device 136 may be a device which receives content from a plurality of sources, e.g., VCR's, DVD's, television or cable programming. Also possibly included in room 118 is a switching control system 134 with a plurality of control knobs 135. Using knobs 135 on switch 134, a user is able to select content from a variety of video players and deliver to any or all of classrooms 110, 112, 114, and 116.

The system is also set up to play live video from any of classrooms 110, 112, 114, and 116. This is done by providing coax outlets 126, 148, 150, and 152 in each of the classrooms. Cables 128, 162, 164, and 166 run from each of these outlets and serve to transmit live video in an analog signal from any of the classrooms back to the control room 118. These signals are receivable into a plurality of analog inputs 130 on a receiving component 132 in the control room.

Regardless of classroom selected for the video presentation, an analog video camera 120 is used to create the video signal. In the FIG. 1 example, camera 120 is shown as being connected via cable 124 into outlet 126 for a live broadcast from room 110. Though used in FIG. 1 for a live feed from room 110, the camera could easily be plugged into outlet 148 in room 112, outlet 150 in room 114, or outlet 152 in room 116. This makes live feeds from any of the classrooms possible.

Regardless of the classroom, someone in the equipment room must stop or pause all the media playing devices, e.g., VCR's, DVD's, currently running. Once these devices have been stopped or paused, this person will then adjust the switches 134 using knobs 135 to match up the live video from line 128 to be broadcast over the televisions in selected classrooms. The presentation may then be made.

Once the broadcast from room 110 is finished, the person in the control room will switch the outputs 138 so that they receive content from the same sources as before the announcement was made. It is then required to manually un-pause and/or play these media devices to resume playing where the video content left off when the switch was made to the live-feed announcement.

These manual requirements make this process taxing. It likely will involve the participation of a second person—other than the presenter—in the school's equipment room to make the necessary switched connections before the presentation. This is so that there is not a significant interruption period caused by the live feed. And it will take this second individual significant time to do all the switching, pausing, and stopping required. Thus, these delays may require the presenter to wait around while the tech personnel try to get things set up.

It is additionally labor intensive to reset all of the interrupted media players to their initial settings after the live-feed presentation is finished. It may also be difficult to remember exactly which media playing devices were running, and which were not. This makes for errors in resetting the devices to their original states after the announcement is made.

The FIG. 1 system also requires the addition of additional cabling to each classroom, e.g., classrooms 110, 112, 114, and 116. These classrooms will typically already have includes a single coax output outlet with a first coax, e.g., cables 154, 156, 158, and 160, for receiving video content to the classroom from the control room. They typically will not, however, include a second line (e.g., cables 128, 162, 164, 166) necessary to receive a live-video feed from the classroom. Thus, this additional cabling must be added at additional expense.

Thus, there is a need in the art for a new system which does not require (i) significant set up prior to the announcement, (ii) significant resetting to return the classrooms to the pre-existing played content thereafter, (iii) the installation of significant additional cabling and associated equipment, or (iv) other resources.

SUMMARY OF THE INVENTION

The present invention is an audio visual system for a facility which includes a video camera, and an encoder, and a decoder. It and works with the existing cable network in the facility. The encoder receives video content from the camera and encodes it into a digital stream. An IP Ethernet connection is used to connect the encoder into the facility's network.

The decoder is maintained on another end of the network. A digital stream signal generated by the encoder is decoded by the decoder into an analog signal. This analog signal is usable by a controller which is also included in the network. Using the controller, the system of the present invention is able to play the live video feed over the camera onto the network.

The system also includes a video all call button or switch which by pressing will start the live video feed and by again pressing will terminate the feed.

In addition to the all call feature, there is also a feature which using a database included in the end coder will record all of the states of media players associated with the controller. The encoder records these states so that after the live broadcast is completed, all of the devices on the system may be returned to their original states, e.g., play, pause, at the exact same instance in which they existed prior to the beginning of the video all call.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 2:
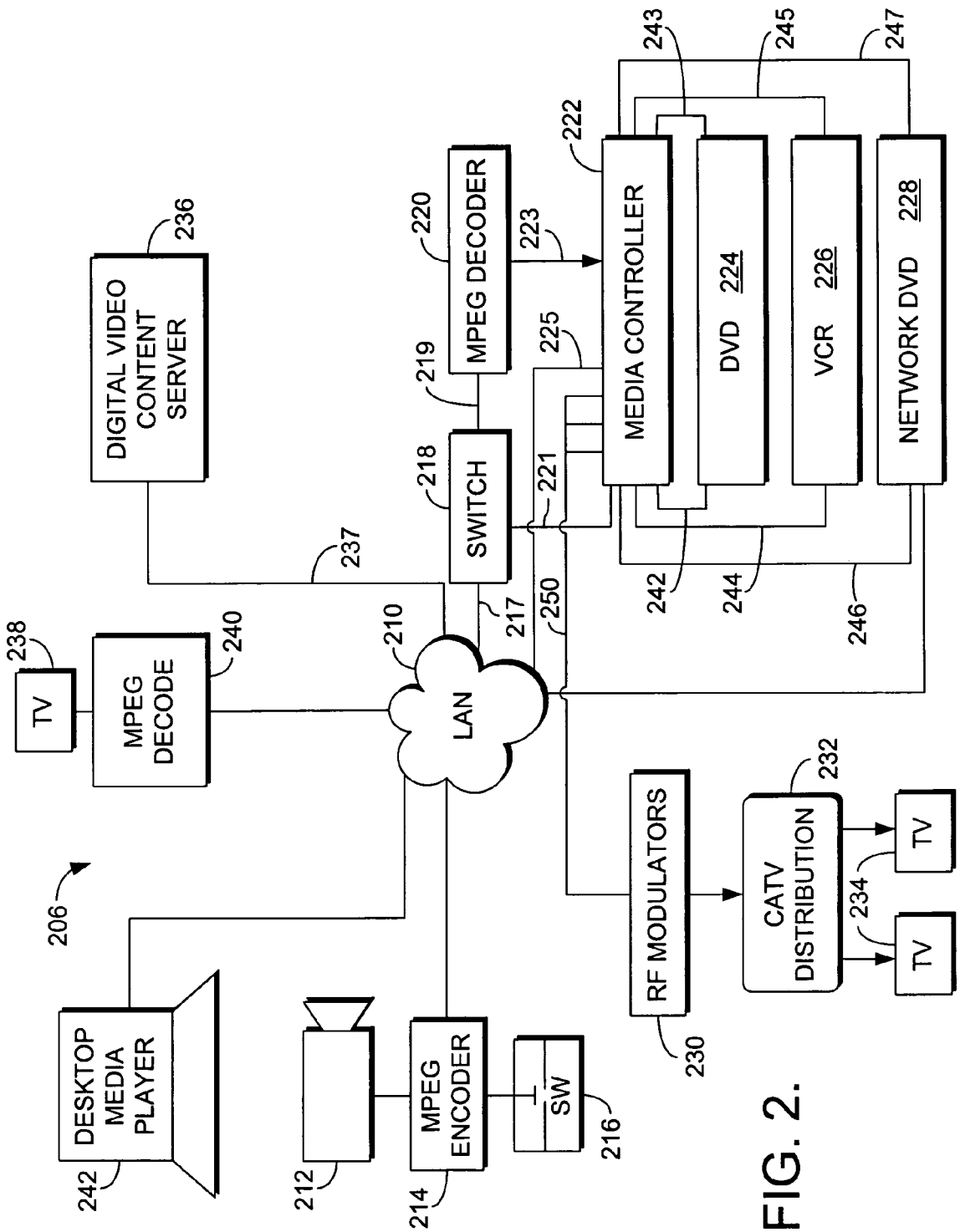
FIG. 2 shows a schematic diagram showing an embodiment of an environment in which the present invention may exist or be practiced.
Figure 3:
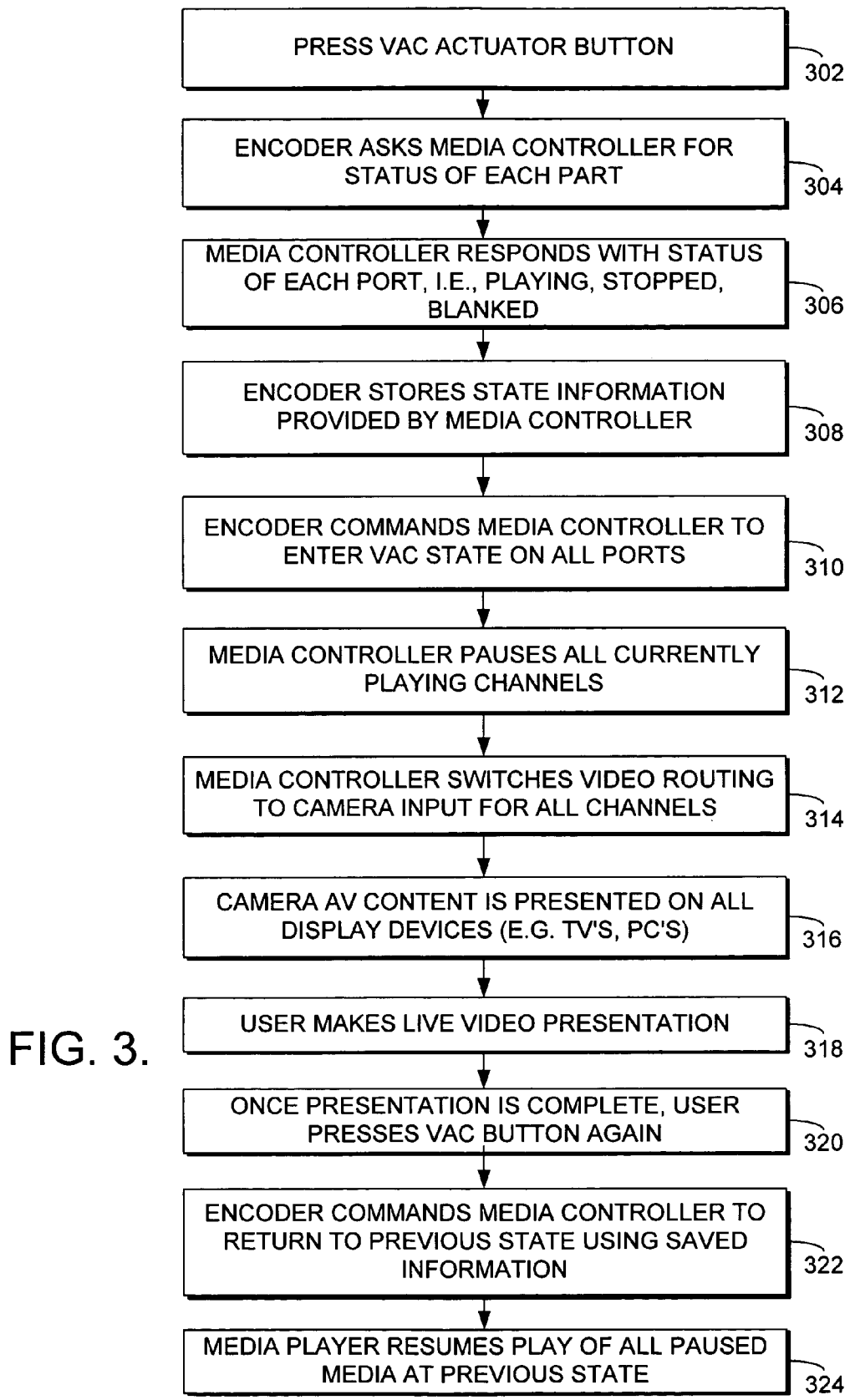
FIG. 3 is a flow chart showing the steps used to practice one embodiment of the present invention.

Embodiments of the present invention are shown in FIGS. 2 and 3. FIG. 2 shows a schematic diagram of the system of one embodiment of the present invention. FIG. 3 is a flow chart showing the steps used to practice an embodiment of the present invention.

Referring first to FIG. 2, we see an embodiment 206 of the system of the present invention involves utilization of a facility's local area network (LAN) 210. One component in the LAN arrangement is a video camera 212. Camera 212 may be a digital camera, or any other video source capable of taking visual imagery and reducing it to a digitally compressible signal. Numerous types of digital video cameras will be known to those skilled in the art, and the present invention is not intended to be limited to any particular type.

Associated with and connected into camera 212 is an encoding device 214. Digital encoding devices, or "encoders," reduce digital information, here received from camera 212, and compress the data into an MPEG data stream or an MPEG bit stream. This makes the data easily transmittable. Here, however, the encoder has been modified to include special equipment. One add-on item is a video override switch 216. This video-actuating switch 216 could take numerous forms. Here it is a simple push button. Pressing the button will cause the system to enter video all call mode, and video from camera 212 will be displayed on a plurality of predesignated audio visual display devices in the facility.

Aside from having a video actuating switch, The encoder must also be of the programmable variety. It should be programmed such that activation of the switch sends information in a signal to the rest of the system indicating all-call status. Encoder 214 should also be equipped with a memory component (not shown, included in encoder 214) which will be used to record a plurality of states for numerous video devices, as will be described in detail later.

Upon activation of actuator switch 216, camera 212 will receive images and, with encoder 214, a data stream will be created and then transmitted across LAN 210. This streamed digital AV signal is then receivable by some, or normally all of the audio-visual display devices in the system.

Before it may be viewed on conventional analog equipment, e.g., televisions, a conversion from digital to analog must take place. This might happen in a variety of ways. In the FIG. 2 embodiment, the facility's cable television system is accessed using a cable 217 which leads to a switch 218.

Switch 218 presents two paths—cable 219 and cable 221—both of which ultimately lead to the existing cable network in the facility through a media controller/router 222.

If switch 218 is in one position, the data stream travels via cable 219 and is received by a stand-alone MPEG decoder 220, converted to a analog signal, and then directed into analog-receiving components on and in controller 222. This will most likely be the position of the switch when the system is in video-all-call mode.

Switch 218 may comprise any kind of switch applicable and useable with the disclosed system. For example, if the conduit used is Ethernet, an Ethernet switch would be used. A USB switch would be used for USB connectivity, and so on. It could also comprise some kind of software based switch. Really, any device or program could be used which results in optional delivery of the live-data-stream video feed through one of cable 219 or cable 221.

Decoder 220 may be any kind of digital decoding device. These devices are well known in the art. This decoder 220 accepts the digital or bit video stream through switch 218 (when the switch is open to such) and converts the stream into an analog signal 223. This analog signal will be directly received by controller 222 and then delivered to the facility's cable network.

If switch 218 in a second position, the data stream travels via cable 221, still in digital, to media router 222 where the digital signaling will be managed by the controller. This is the likely switch position when the system in normal mode. When in normal mode, some ordinary uses of the system might be the display of a DVD or VCR movie in one or more classrooms. Other activities might include accessing digital video content off of digital video content server 236.

More details regarding one embodiment of controller 12 may be gleaned from U.S. patent application Ser. No. 10/694, 337, filed Oct. 27, 2003. The contents of that application are herein incorporated by reference in their entirety and are to be considered a part of this original disclosure.

The internal functionality of controller 222 is discussed in the earlier filed application referenced above, and, thus, will not be discussed in detail here. Generally, however, controller 222 contains processing components and data storage components. It will have to be programmed to accomplish all the objectives disclosed. These components enable the controller 222 to successfully be interfaced by the phone system of the facility (not shown), a desktop computer 242 with media-player software installed thereon, any other workstations on the LAN, MPEG encoder 214, a digital video content server 236, and any other smart devices included in the LAN. The software and hardware needed to accomplish this interfacing will fall within the scope of that which is known to one skilled in the art.

Controller 222 is an optionally-rack-mounted device with an encasing housing. It's processing component comprises a microprocessor, supporting memory (RAM), an Ethernet controller, a DTMF controller, and additional control circuitry for processing and controlling requests between various system components.

The controller may be communicated with through an Ethernet connection 225 over the LAN. It also may be interfaced with using a manual keypad included on its housing. Other means of interfacing with the device, e.g., over the phone, are also possible and would fall within the scope of this invention.

Through this interfacing, controller 222 can be manipulated to cause analog signals 223 to be distributed through conduit 250 to the cable television distribution network 232. Controller 222 can also be caused to control the functions of a DVD player 224, a VCR 226, a Network DVD player 228.

To accomplish this, controller 222 has a plurality of IR emitters (not shown). The controller 222 is able to control DVD player 224, a VCR 226, a Network DVD player 228 through infrared lines of communications 242, 244, and 246 much in the same way a typical commercially available IR remote is used to control these devices. The IR equipment inside controller 222 is much the same as these well-known remote control devices. The emitters, through infrared lines of communications 242, 244, and 246 are used to send specific signals to the DVD/decoders such as playback, reverse, pause, and other similar commands. A bulk emitter (not shown) is also provided as part of the controller 222. This bulk emitter usually serves to send on/off signals to the DVD/decoders. Infrared lines of communications 242, 244, and 246 may be completely wireless. When necessary, however, IR extension cabling may be required to give the signal adequate range when the player devices are not located in close proximity to the controller 222. Media players such as DVD player 224, a VCR 226, a Network DVD player 228 come from the factory already adapted to receive specific IR commends to perform specific functions. Controller 222 takes advantage of this by using IR for control purposes. This allows the user to select off the shelf media player devices rather than manufacturing new ones or making modifications.

Video content playing on devices 224, 226, and 228 is returned to ports on controller 222 through RCA or other media cables 243, 245, and 247, respectively. Thus, the media devices can be controlled by infrared through lines of communications 242, 244, and 246, and audio-visual content will be returned through conduit 243, 245, and 247.

Analog video content leaving controller 222 via cable(s) 250 will be readied for transmission to the cable network by being modulated by RF modulators 230. The resulting modulated signal will be demodulated by demodulators contained in each of a plurality of televisions 234.

These televisions 234 may also be controlled via IR signaling much like the media player devices. Here, it is even more likely to do so with IR extensions to obtain the needed range. Using IR signaling, the televisions may be, inter alia, turned on, turned off, be turned to a desired channel, or set to accept a video feed.

Digital video content server 236, which is also included in the LAN 210, is a computing device containing numerous audio-visual files. In this embodiment, these audio-visual files are in Moving Pictures Expert Group (MPEG) format. Other formats are, of course, possible, and are considered to fall within the scope of the present invention. Some examples of other formats include JPEG, TIFF, Bitmap, Photoshop, and Picture image formats, MP3 and WMA audio formats. MPEGs may be in MPEG1, MPEG2, and MPEG4 video formats.

Typically, server 236 will maintain numerous different audio-visual files thereon. There will also, however, be multiple instances of many or all of these files. This is done so that different users may watch the same video at the same time, but have different start and end times. Each user may thus watch a different instance of the same MPEG. This enables video on demand to each classroom in the facility.

Controller 222 is able to communicate with and receive streamed video files (e.g., MPEGs) from server 236 using Network DVD/decoder 228. Network DVD/decoder 228 is a newly developed off-the-shelf item. Two versions now commercially available are GoVideo™ networked DVD player or a Gateway™ connected DVD player. Like a conventional DVD players, these new devices include a CD player in which the user may simply insert a CD and play it on a television or other media player. In addition to these older technologies, however, the new DVD/decoders are able to stream movies, music, and pictures from a digital system to an analog electronics component. They come with software that will be loaded onto server 236 in a manner that will be known to those skilled in the art. This software enables the DVD/decoder to access audio/video files on video server 236 and then stream the file to the decoder inside DVD/decoder 228. The software is made available by the manufacturer of these devices.

This streaming technology enables music, movies and pictures stored on server 236 to be selected and then played on analog-based devices.

The access by Network DVD/decoder 228 to server 228 occurs through LAN 210 through a conduit 237. To access video files, the user navigates to a directory on server 228 using the network DVD/decoder's software. This navigation is observable over a computer or television monitor in a way which will be known to those skilled in the art, and may be learned by review of manuals which come with DVD/decoder devices as purchased. Conduit 237 may comprise an Ethernet connection, or numerous other possible forms of network connectivity. Wireless connections are also a possibility here, and also, it should be mentioned with respect to any of the other connective means employed in system 206.

An independent television 238 is also shown. This television 238 is able to receive video content over network 310 using another digital decoder 240. This decoder may be similar to decoder 220. Here, however, it is used to provide video content (and live video feeds from camera 212) independently from the facility's cable TV distribution network 232.

Also included on the network 210 is the already-referred-to desktop media player 242. This is simply a standard PC with media player software installed thereon. This device is able to accept streamed video from either camera 212 or from server 236 and play it using a standard computer monitor and speakers.

Figure 1:
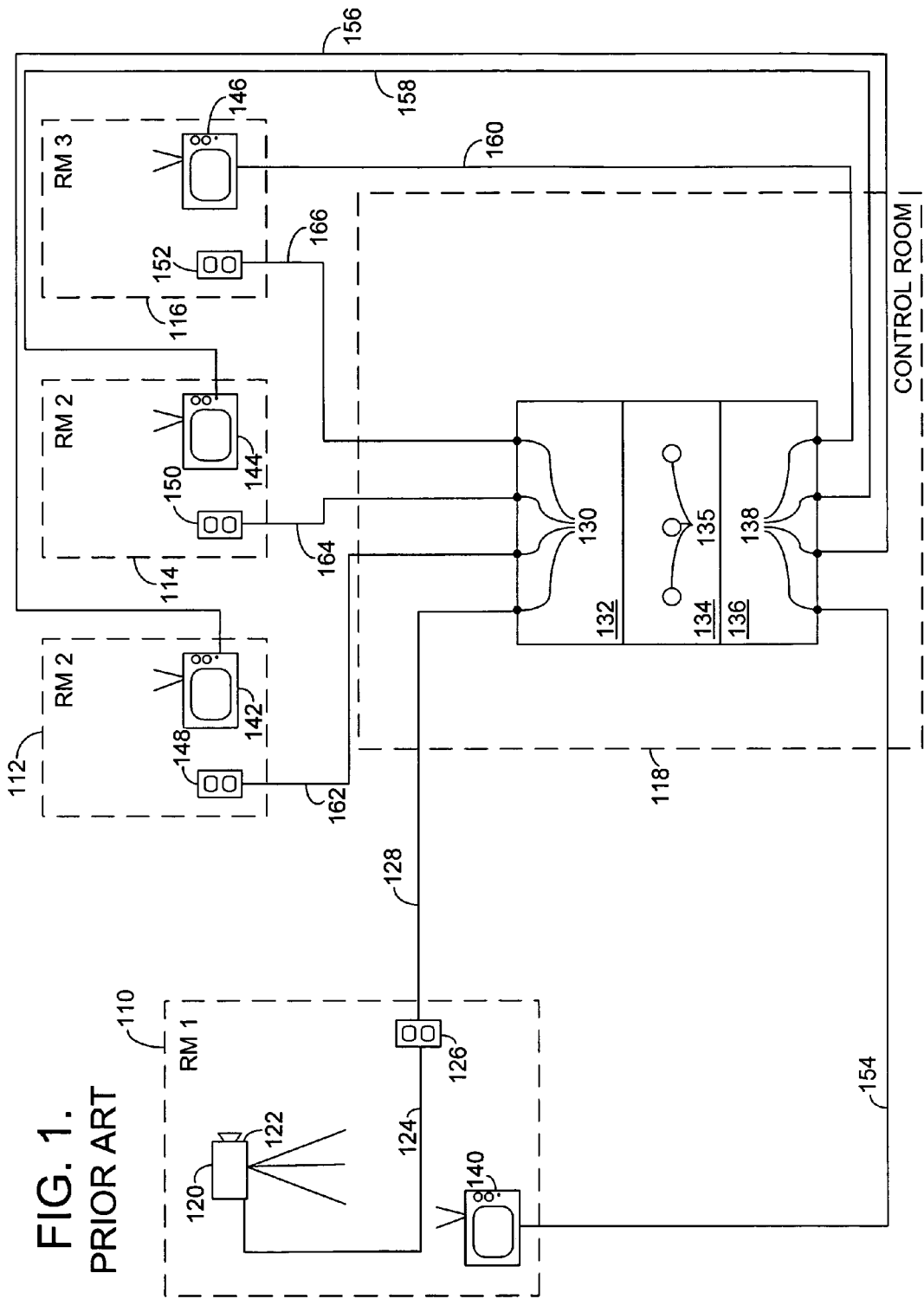
FIG. 1 is a schematic representation of a typical system for a facility in which a camera is able to live video announcement from a plurality of different classrooms.

The single camera shown in the FIG. 2 system is very versatile because of its networkability. Though FIG. 2 does not show a plurality of classrooms like FIG. 1, it should be understood that this camera, or multiple cameras can be tapped in to the network through any connector (e.g., Ethernet or IP) in any classroom. This type of networking equipment is normally already existent in a typical modern school classroom. This makes a single camera able to make live broadcasts from any existing classroom on the network without installing any additional connective equipment, e.g., cabling, outlets.

One embodiment for the steps of the video-all-call process of the present invention is shown in FIG. 3.

The process first involves some preliminary set up not disclosed in FIG. 3. First, the camera 212 and MPEG encoder 214 should be provided in a particular classroom in which a live video feed is to take place from. Most likely, MPEG encoder 214 and camera 212 will be tapped into the local area network 210 via some form of IP connection, e.g. Ethernet. You will recall that encoder 214 must be selected or adapted to include a pushbutton switch 216 which will cause the necessary signaling and transmission of video. Once the camera is set up and arranged to record the video feed, the FIG. 3 process is ready to begin.

Step 302 begins this process. In step 302 the user presses the video all call (VAC) actuator button 216. Once this button is pressed, it activates the camera 212 and MPEG encoder 214 to begin the live-video feed.

At this time in step 304 the encoder 214, which is a smart device, communicates with the media controller 222. Encoder 214 asks controller 222, which includes processing capabilities, the status of each of its ports. The status (e.g., paused, playing, or "blanked" which means that the device is placed in a state that would make the screen on a monitor appear to be off or blacked out by displaying an all-black screen) for each port on controller 222, if the port is connected to an AV device, will be known to controller 222. For example, DVD 224 may be represented and connected through a particular port. VCR 226, however, would be represented and tapped into the controller 222 on a different second port. Finally, network DVD 228 would be included on a completely separate port.

In response to the inquiry, media controller 222 responds to encoder 214 with the status information in step 306. The response will include the particular status on each port. For example, with respect to the port (on controller 222) which is connected to DVD 224, the media controller response would be that the DVD is, e.g., playing stopped or blanked. The media controller 222 would also respond with the status of the ports for the VCR 226 and network DVD 228. The status of numerous other devices could also be included with this information. Through DVD decoder and controller 222, the state information would also include any particular version of an MPEG video being streamed from digital video server 236 and being played over network DVD decoder 228.

In step 308 encoder 214 which is mentioned above a smart device, stores this state information provided by media controller 222 in memory (not shown) in encoder 214. This information will be used later in the process to return all devices to their previous state before the video all call.

Once encoder 214 receives the necessary state information, in step 310 it commands media controller 222 to enter video-all-call state on all of its ports. This will cause, in step 312, the media controller 222 to pause all currently playing channels. For example, if an instance of an MPEG file on server 236 is playing over network DVD 228, this particular instance of the movie, e.g., a video biography, will be paused at the exact point in the movie that the video all call button on encoder 214 was pressed. It is the same for a tape playing on VCR 226, or a movie on DVD 224. Any media playing will be paused via infra red signaling through infrared lines of communications 242, 244, and 246.

Next, in step 314, controller 222 switches video routing from whatever prior media was being played on any of the devices in the system 206 to accept the live-video feed from camera 212. In one embodiment, the live video will be played over all channels on all ports. As a result, in step 316 the camera audio/video content is presented on all the display devices, e.g. TVs on the cable distribution network 232, the desktop media player 242, the stand alone TV 238, and any other devices which might be included in such a network. This enables the user to make a live video presentation as disclosed in step 318 from a particular selected classroom inside the school.

Once the video presentation is complete, in step 320, the user presses the video-all-call button 216 again to end the presentation. Upon this second activation of the button switch 216, the encoder, in step 322, commands media controller 222 to return to its previous state using the information which was previously saved in the memory on MPEG encoder 214 regarding the state of all of the particular devices on the network, e.g., DVD 224, VCR 226, network DVD 228. The encoder does this by sending messages to the media controller with respect to each state.

In step 324, the media controller 222 resumes play on all of the devices (e.g., DVD 224, VCR 226, network DVD 228) to the same state, and the same position in any playing media, that it was in before the video-all-call activation. For example, for the video biography being streamed from server 236 over network DVD 228 (this was referred to above already) the biography will be resumed at the exact location at which it was formerly interrupted by the video all call. The same is true for any tapes playing on VCR 226 or any DVD's playing on DVD 224. All media paused for the announcement is restarted exactly where it left off. Thus, all the previous existing states are reinstituted. This prevents students from missing out on large chunks of an audio-video recording which would otherwise be disrupted by the overriding live video feed.

As can be seen, the present invention and its equivalents are well-adapted to provide a new and useful method of and system for delivering media content within a facility. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An audio-visual system for a facility, comprising:
   a video camera in one of a plurality of classrooms;
   an encoder for receiving video content from said camera and encoding said video content into a digital stream, said encoder connected into said network in the one of the plurality of classrooms;
   a decoder also connected into said network, said decoder adapted to receive said digital stream and transform said digital stream into an analog signal which is playable to a plurality of video display devices in said facility;
   an override mechanism connected to said network that activates the video content for display on a predesignated number of the plurality of video display devices in said facility in response to a first selection of the override mechanism, the override mechanism being operable to activate the video camera and the encoder to capture the video content in real-time in response to the first selection; and
   a controller adapted to determine a plurality of states for a plurality of ports communicating media content to a plurality of video display devices from a plurality of media players in said facility in response to the first selection of the override mechanism, store the plurality of states for each of the plurality of ports and the plurality of media players, pause playback for each of the plurality of ports, communicate the video content to each of the plurality of ports communicating with the plurality of video display devices, and return the plurality of ports and associated plurality of media players to the plurality of states in response to a second selection of the override mechanism, wherein the controller controls the plurality of media players utilizing infra red signals.

2. The system of claim 1, wherein the override mechanism is a switch activated by a user utilizing a push button, the override mechanism being integrated with the encoder and the video camera.

3. The system of claim 2, wherein the plurality of states indicates a playback status or blanked status for each of the plurality of media players and the plurality of video display devices.

4. The system of claim 3, comprising:
   a termination component associated with said encoder for terminating said digital stream;
   a data storage associated with said encoder, said storage adapted to receive said plurality of states from said controller and store said plurality of states for a transmission of said plurality of states back to said controller, said transmission being made for the purpose of returning said plurality of video devices back to said plurality of states after said termination component terminates said digital stream.

5. The system of claim 1, wherein said system includes a plurality of video cameras each of the plurality of video cameras being associated with one of a plurality of override mechanisms.

6. The system of claim 3, wherein said controller broadcasts the video content through the plurality of ports.

7. The system of claim 1, comprising:
   a desktop media player connected into said network, said desktop media player adapted to receive said digital stream and display said video content.

8. The system of claim 1, comprising:
   a digital video content massive storage device for maintaining a plurality of video files for streaming into said network.

9. The system of claim 3, wherein said at least one video device is a television, wherein the network is an Ethernet network, wherein the analog signal is played to the plurality of video display devices through a cable network, wherein the digital stream is an MPEG data stream, wherein the facility is a school, wherein the first selection activates a video-all-call signal to the system, and wherein the controller sends a signal to the plurality of video display devices indicating an all-call status associated with the first selection.

10. The system of claim 5, wherein the plurality of media players are a server, DVD player, VCR, or networked media player located in the school, wherein each of the plurality of video cameras are positioned within a separate classroom of the school.

11. A method of enabling a live audio-visual presentation in a facility, comprising:
   receiving a user selection of a switch in communication with a camera and a digital encoder;
   determining a plurality of states of a plurality of ports communicating media content from a plurality of media players to a plurality of displays in the facility in response to the user selection;
   storing the plurality of states for the plurality of ports;
   pausing playback to the plurality of displays from the plurality of media players;
   entering a video-all-call state on all of the plurality of ports in communication with the plurality of displays;
   activating the camera and the digital encoder to capture video content in real-time in response to determining the plurality of states;
   converting the video content received from the camera in real-time into a digital stream utilizing the digital encoder;
   communicating the digital signal to a decoder;
   converting the digital signal to an analog signal in the decoder for communication to the plurality of displays in the facility through a network;

displaying the analog signal on the plurality of displays; and returning to the stored plurality of states for each of the plurality of ports communicating media content to the plurality of displays from the plurality of media players in response to another selection of the switch.

12. The method of claim 11, further comprising:

a plurality of cameras each associated with one of a plurality of switches, wherein the video content is received from one of the plurality of cameras in response to a user selection of the associated switch.

13. The method of claim 12, wherein each of the plurality of cameras is located within a separate classroom of a school, and wherein each of the plurality of switches is integrated with each of an associated plurality of encoders.

14. The method of claim 11, further comprising:

controlling the media content displayed to the plurality of displays through a controller, said controller being adapted to manage a state of operation for the plurality of media players in said facility, the digital signal being communicated through an Ethernet network and the analog signal being communicated through a cable network.

15. The method of claim 14, wherein the plurality of states include playback states and a blanked state, and wherein the returning further comprises:

playing the media content to the plurality of displays that was playing before the selection of the switch, wherein the media content played to the plurality of displays is paused between the user selection and the another selection.

16. The method of claim 14, comprising:

receiving information regarding said at least one state of operation from said controller;

accessing a storage medium;

using said storage medium to record said state;

using said information to return said at least one video player device to said state of operation upon termination of said video content.

17. The method of claim 14, wherein said controller manages the at least one video playing device utilizing infra red signaling.

18. A device for causing the display of a live audio-visual presentation in a school facility, comprising:

a digital encoder useable with a camera and includable in a facility computer network;

said encoder adapted to receive real-time video content from said camera in real-time and encode the real-time video content into a digital stream within one of a plurality of classrooms in the school facility;

a switch of said encoder, said encoder being adapted such that when said switch is activated, a video-all-call signal is transmitted which interrupts current media playing on the network and replace said media playing with the real-time video content included in said digital stream; and a controller in communication with the encoder through the facility computer network, the controller being operable to manage a state of operation for a plurality of media players in the school facility, determine the state of operation for the plurality of media players in response to the switch being activated, provides the encoder a status of each port corresponding to the plurality of media players, pause playback of media content to the plurality of displays, store the status of each of a plurality of ports and commands the controller to return to the status including playback of the media content in response to another selection of the switch, the controller managing communication of the real-time video content to each of the plurality of displays in communication with the controller through the plurality of ports.

19. The device of claim 18, wherein the switch is integrated with each of a plurality of video cameras in the school facility.

20. The device of claim 19, comprising:

a terminating mechanism associated with said encoder for terminating said digital stream upon completion of said live presentation.

21. The device of claim 20, comprising:

a storage medium used to receive information regarding said state of operation from said controller and later be accessed to use said information to return said plurality of media players to said state of operation upon completion of said real-time video content, wherein the state of operation includes a playback state or a blanked state.

22. An audio-visual control system for use in a facility comprising:

a video camera network throughout the facility;

a video-camera interface for communicating with a video camera over an IP network;

a switch component for activating the video camera;

an encoder component for converting video content received from the video camera to a digital signal communicated through the IP network of the facility;

a data storage medium for storing a state of operation of said media-player device for later retrieval in response to a first selection of a switch associated with the video camera and the encoder to enter a video-all-call mode, wherein media playback for the video output is paused during the video-all-call mode;

a transmitting component for transmitting commands to a plurality of media player device;

a decoder component for converting the digital signal to an analog signal;

a video output for playing the analog signal of video content received from said camera over at least one display device, the analog signal being communicated through a cable network; and a state-return system for returning said media-player device to said state of operation in response to a second selection of the switch.

23. The system of claim 22, comprising:

a user-control interface enabling a user access to said media-player device over one of the computer network and a telephonic device.

24. The system of claim 22, wherein the switch is integrated with each of a plurality of video cameras included in the video-camera network.

25. The system of claim 24, comprising:

a state-return system for returning said media-player device to said state of operation in response to a second selection of the switch.

26. The system of claim 22, wherein said transmitting component comprises:

an infrared emitter being operable to control a plurality of media players.

* * * * *